United States Patent [19]
Brodie, III et al.

[11] Patent Number: 5,362,784
[45] Date of Patent: * Nov. 8, 1994

[54] ALDEHYDE SCAVENGING COMPOSITIONS AND METHODS RELATING THERETO

[75] Inventors: Vincent Brodie, III, Wilmington, Del.; Donna L. Visioli, Lower Gwynedd, Pa.

[73] Assignee: E. I. Du Pont de Nemours and Company, Wilmington, Del.

[ * ] Notice: The portion of the term of this patent subsequent to Feb. 8, 2011 has been disclaimed.

[21] Appl. No.: 67,251

[22] Filed: May 28, 1993

[51] Int. Cl.$^5$ ............... C08K 5/21; C08F 283/00; B65B 55/00
[52] U.S. Cl. ................... 524/211; 524/252; 525/418; 525/437; 426/410; 426/415
[58] Field of Search ............. 524/211, 252; 525/418, 525/437; 426/410, 415

[56] References Cited

U.S. PATENT DOCUMENTS

| | | | |
|---|---|---|---|
| 3,126,246 | 3/1964 | Cappuccio et al. | 524/252 |
| 3,769,261 | 10/1973 | Clampitt et al. | 524/252 |
| 4,547,350 | 10/1985 | Gesser | 423/210 |
| 4,892,719 | 1/1990 | Gesser | 423/245.1 |

FOREIGN PATENT DOCUMENTS

| | | | |
|---|---|---|---|
| 374861 | 12/1989 | European Pat. Off. | |
| 789560 | 12/1980 | U.S.S.R. | 524/252 |

OTHER PUBLICATIONS

Gesser, H. D., "The Reduction of Indoor Formaldehyde Gas and that Emanating-from Urea Formaldehyde Foam Insulation (UFFI)" *Environment International*, vol. 10, pp. 305–308, 1984.

Gesser, H. D., et al., "Removal of Aldehydes and acidic Pollutants from Indoor Air" *ES&T Research*.

"MICA A-131-X Water Borne Extrusion primer and Laminating Adhesive" Product Information.

DeRoo, A. M., "Polyethylenimide in Adhesives", Chapter 36, pp. 592–596.

Miltz, J., et al., "The Effect of Polyethylene Contact Surface on the Shelf Life of Food Products", pp. 245–257.

Potts, M. W., et al. "Relative Taste Performance of Plastics in Food Packaging", *Journal of Plastic & Sheeting*, vol. 6, Jan. 1990, pp. 31–43.

Kim-Kang, H., "Volatiles in Packaging Materials", *Food Science and Nutrition*, 1990, pp. 255–271.

Landios-Garza, J. et al., "Plastic Packaging Can Cause Aroma Sorption", Food Engineering, Apr. 1987, pp. 39 & 42.

Tavss, E. A., et al., "Analysis of Flavor Absorption into Plastic Packaging Materials Using Multiple Headspace Extraction Gas Chromatography", *Journal of Chromatography*, 438 (1988) 281–289.

Salame, M., "Retaining Flavor in Plastics-Packaged Products", *Plastics Packaging*, 1988.

Aminabhavi, T. M., "An Overview of the Theoretical Models Used to Predict-Transport of Small Molecules Through Polymer Membranes", *JMS-Rev. Macromol. Chem. Phys.*, C28(3&4), 421–474 (1988).

Kail, J. A. E., "Flavor Barrier Evaluation Enhances Material Selection", *Packaging*, Sep. 1984, pp. 68–70.

*Primary Examiner*—Kriellion S. Morgan
*Attorney, Agent, or Firm*—Konrad S. Kaeding

[57] ABSTRACT

The present invention relates generally to compositions of polyalkylene imine ("PAI"), particularly polyethylene imine ("PEI") and polyester polymer(s) (including copolymers and derivatives thereof); such compositions can be used in producing films or devices which are capable of scavenging unwanted aldehydes. More specifically, the preferred compositions of the present invention comprise a PAI substantially discontinuous phase and a polyester or copolyester substantially continuous phase in a weight ratio of PAI to polyester polymer of about 0.001–30:100 which optionally also includes a binding agent.

11 Claims, No Drawings

ALDEHYDE SCAVENGING COMPOSITIONS AND METHODS RELATING THERETO

FIELD OF THE INVENTION

The present invention relates generally to compositions of polyalkylene imine ("PAI"), particularly polyethylene imine ("PEI") and polyester polymer(s) (including copolymers and derivatives thereof); such compositions can be used in producing films or devices which are capable of scavenging unwanted aldehydes. More specifically, the preferred compositions of the present invention comprise a PAI substantially discontinuous phase and a polyester or copolyester substantially continuous phase in a weight ratio of PAI to polyester polymer of about 0.001–30:100 which optionally also includes a binding agent.

BACKGROUND OF THE INVENTION

A co-inventor of the present invention is also a co-inventor to "Novel Packaging Compositions That Extend The Shelf Life Of Oil-Containing Foods", U.S. Ser. No. 07/724,421, filed Jul. 3, 1991, in which PEI is disclosed to have aldehyde scavenging capabilities (which can extend shelf life of oil-containing foods) when used as part of a packaging material. The present invention is an important improvement to U.S. Ser. No. 724,421.

U.S. Ser. No. 724,421 teaches the application of a thin coating of PEI as part of a multilayer composite film. However, the application of a thin coating of a material adds to the overall manufacturing complexity and creates an additional layer to be accomodated in a multilayer packaging structure.

PEI is a highly viscous liquid and is generally considered not to be pumpable. Furthermore, liquids generally do not pre-compound well with polymeric materials which are solid at room temperature, because the liquid will generally tend to bloom to the surface or otherwise migrate within the solid polymeric material; surface migration of PEI would generally cause the pre-compounded granules to stick to one another and inhibit flow into an extruder or the like.

The present invention overcomes or dramatically decreases the above described problems.

SUMMARY OF THE INVENTION

The present invention is directed to a novel composition of polyalkylene imine ("PAI"), most preferably polyethylene imine ("PEI"), and polyester polymer. As used herein, polyester polymer is intended to also include copolymers or derivatives thereof. Hence, the polyester polymer of the present invention can be a very wide variety of polymeric materials, such as poly(ethylene terephthalate), poly(burylene terephthalate) and the like.

An important property of the polyester polymer is that it should have properties sufficient to allow the polymer to be made into a thin film or sheet and used in a packaging application. In an alternative embodiment, the polyester polymer is chosen which is capable of heat sealing to itself in a packaging application.

The combination can be incorporated into a film and placed in direct or indirect contact with a food product. The film will scavenge unwanted aldehydes from the food product but will generally not allow PAI migration from the film.

"Binding Agents" can be added to the compositions of the present invention to further "lock in" the PAI to the polymer matrix. Useful binding agents are functionalized polymers such as functionalized olefinic polymers and copolymers, particularly polymers functionalized with carboxyl functionality, most particularly anhydride functionality.

Other optional additives include plasticizers, tackifiers, processing aids, pigments and the like, including any conventionally known additive for the production of films for packaging applications.

The PAI and polyester polymer are preferably blended in a weight ratio of about 0.001–30:100 at temperatures between about 85° C. and about 300° C., more preferably between about 100° C. and 225° C. The method of producing the blend is not material, as long as a relatively uniform distribution of the PAI polymer through the polyester polymer is obtained. It is preferred for the blend to have intimate mixing of the polymers, i.e. microscopic distribution of PAI through the polyester polymer, whereby the size of the dispersed phase is no more than 10 microns, preferably about 1 micron or less.

Alternative methods for preparing a blend can be used within the scope of this invention. For example, a masterbatch method can be used to form the unique blend.

DETAILED DESCRIPTION OF THE PREFERRED EMBODIMENT

Introduction

The present invention is directed to a novel composition of polyalkylene imine ("PAI"), most preferably polyethylene imine ("PEI") and polyester polymer which can be made into a film and used in a structure containing a functional barrier between this novel composition and a food product, or in an alternative embodiment, used as the food contact layer. The film will scavenge unwanted aldehydes from the food product but will generally not allow PEI migration from the film. In the alternative embodiment, "binding agents" are added to the compositions of the present invention which even more securely bind the PEI into the polymer matrix.

Each component (and optional additives) of the present invention will be discussed separately, followed by a discussion involving the combining of these components and their use in a film structure.

Polyester Component

Virtually any conventional or non-conventional polyester or copolyester can be used in accordance with the present invention, provided it is capable of forming a substantially continuous phase when blended with the PAI component of the present invention. Useful polyesters can be generally defined as polymeric materials in which ester groups exist in the main chain(s), including conventionally known homo- and co-polyesters, such as saturated alkyl polyesters, unsaturated alkyl polyesters, and aromatic polyesters.

The polyester compositions can be synthesized by self-polycondensation of hydroxycarboxylic acids or the polycondensation of dicarboxylic acids with dihydroxy compounds, using methods which are well known to those of ordinary skill in the art. Preferred polyesters include terephthalate polyesters and copolyesters which are generally synthesized by ester interchange, because the free acid is insoluble and otherwise difficult to incorporate into a reaction system.

Polyester chemistry in general is extremely well known and such conventional polyester materials are generally useful in accordance with the present invention, depending upon the end use chosen. Ordinary skill and experimentation may be necessary in choosing any particular polyester material, depending upon the properties required for any particular application. Generally speaking, aliphatic polyesters are generally relatively soft, and aromatic derivatives tend to be relatively tough or hard and brittle. The properties of the polyester can generally be modified by cross-linking, crystallization, plasticizers, or fillers.

Polyalkylene Imines ("PAI")

The preferred polyalkylene imines of the present invention can be defined according to the following structure:

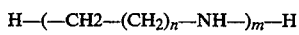

in which n and m are the same or different and have a numerical value of at least 1. A high percentage of nitrogen is preferred, and therefore preferably, n is 1 to 4, more preferably 1 (polyethylene imine or "PEI"), and m is preferably a value of a hundred or more. It is generally most advantageous to avoid use of very low molecular weight materials having excessive amounts of materials which can migrate. The most preferred molecular weigh (determined by light scattering) is preferably above about 800 and more preferably above about 1500 and most preferably above about 2500.

PEI is synthesized from aziridine (or ethyleneimine) generally through sulfonic acid esterification of ethanolamine; the monomer is then reacted in an acid-catalyzed ring-opening homopolymerization to form the PEI molecule. In the most preferred embodiment, the PEI is not heavily branched and preferably has a relatively low percentage of tertiary amines.

Optional Additives

"Binding Agents" can be added to the compositions of the present invention to further "lock in" the PAI to the polymer matrix. Useful binding agents are functionalized polymers which will react with polyalkylene imine. Preferred binding agents are polymers functionalized with carboxyl functionality, most particularly anhydride functionality.

Other optional additives include antioxidants, lubricants, disspersants (or surfactants) in an amount of about 5 percent by weight or less. Conventionally known additives relating to film manufacturing or processing can optionally be used as part of the present invention.

Combining the Polyester Polymer With the PAI

The present invention is also directed to a process for preparing a blend of polyester polymer and PAI comprising the following steps:

(i) adding the PAI and polyester polymer in a weight ratio of about 0.001–30:100 to a compounding extruder, Banbury mixer or the like; and (ii) blending the mixture at temperatures between about 150° C. and about 350° C. (more preferably 220° C.–280° C.), thereby forming a polymer blend.

The present invention also relates to a process for preparing films by a compounding or masterbatch process.

The method of producing the blend is not material as long as a relatively uniform distribution of the PAI polymer through the polyester polymer is obtained. It is preferred for the blend to have intimate mixing of the polymers, i.e. microscopical distribution of PAI through the polyester polymer, whereby the size of the dispersed phase is no more than 100 microns, preferably about 10 microns or less.

In one modification, the blend components are extruded, and the blend is obtained as the extrudate. In an alternate modification, the components are blended in other mixing devices which exhibit high shear, such as a Banbury or similar-type mixer.

The blend of PAI and polyester polymer can be prepared by the following process:

the PAI is metered into a polyester polymer influent stream into an extruder-type apparatus;

the combination of material is then moved into a feeder attached to a 15 mm co-rotating twin screw extruder (or the like), such as one made by Baker Perkins (a 30 mm twin screw extruder may also be used, such as a Werner and Pfleiderer extruder, and even larger equipment is contemplated as useful herein).

The feed rate can be set at different rates without affecting the resultant product. The mixture can be starve fed (less than the capacity of the screw) or flood fed (more than the capacity of the screw). The extruder can be run at a variety of speeds, such as 300 rpm for a 15 mm extruder. The resulting extruded strand is preferably quenched (such as in water or the like) at room temperature, then fed into a chopper to form pellets.

Pellets can then be used to make films in conventional thermoplastic film processing equipment. The extruder can be run at temperatures ranging from about 150° C. to about 350° C. A preferred temperature range can be 200° C. to 280° C. The processing conditions will have to be regulated such as by limiting residence of time of the contents of the mixing device in order to limit possible polymer degradation and achieve desired intimate mixing of the polymer.

An alternative method for preparing a blend involves a masterbatch process, whereby the polyester polymer and the PAI are mixed together in high shear mixing equipment, such as a Banbury mixer extruder or the like.

Whether the final mixture is made by extrusion or high shear mixing, the resulting material can then be used as a concentrate and fed into another polyester polymer stream (either the same or different from the polyester polymer initially mixed with the PAI to form the concentrate) and extruded as described above or mixed in a high shear mixer (as also described above) and ultimately extruded into a film, slabs, sheet or the like.

The final film, slab or sheet product preferably comprises a weight ratio of PAI to polyester polymer in the range of about 0.001–30:100–300, more preferably about 0.001–20:150–250 and most preferably 0.01–10:200.

The Final Composition

The final film composition has been found to be extremely stable. Migration or surface blooming of the liquid PEI within the polyester polymer has been surprisingly found to not be a problem in the practice of the present invention. By incorporating the PAI into an polyester polymer, the PAI can be incorporated into an existing layer of a conventional multilayer packaging structure. This substantially decreases manufacturing complexity, cost and overall complexity of the end product.

Furthermore, the PEI can be incorporated into a packaging material in very low concentrations with substantially uniform distribution. Indeed, concentrations dramatically less than the PEI concentrations suggested in U.S. Set. No. 724,431 are possible according to the present invention. Since less PEI is used according to the present invention, costs are generally lower, particularly in light of the simpler manufacturing process.

It was also somewhat surprising that the PEI was able to maintain its aldehyde scavanging properties, even when alloyed into an polyester polymer. Although carboxyl groups tend to react with the PEI and so diminish the efficacy of the PEI, most polyester polymers provide a useful matrix upon which PEI can be incorporated.

It has been surprisingly found that although the high viscocity of PEI would indicate difficulty in pumping and metering into a melt stream, a back pressure of only 20 or so pounds was able to transport an adequate amount of PEI (which could be acurately metered) into the melt stream to create the concentrate of the present invention.

In the preferred embodiment, a functional barrier is placed over the PAI/polyester polymer film. The functional barrier is preferably permeable to aldehydes but substantially impermeable to PAIs. Generally, the functional barrier can be extremely thin, since the PAI is already locked into the polyester polymer matrix, particularly where a binding agent is used as described above. Generally, the film can be as thin as possible without allowing for holes or non-uniform coverage. Functional barriers of three mils or greater are possible, although thicknesses of less than one rail are preferred. The preferred functional barrier layer is preferably an polyester polymer as already described, most preferably a polyester copolymer, derived from terephthalic acid and a glycol.

What is claimed is:

1. A composition comprising a blend of polyester polymer and polyalkylene imine. ("PAI), whereby the PAI is defined by the following formula:

$$H-(CH_2-(CH_2)_n-NH-)_m-H$$

where n has a numerical value of at least 1 and m has a numerical value of at least 100, and whereby the weight ratio of polyalkylene imine to polyester polymer is in the range of about 0.001–30:100,and wherein the PAI and polyester are mixed at temperatures between about 150° C. and about 350° C., whereby the PAI forms a dispersed phase defining microscopic particles of less than 10 microns.

2. The composition of claim 1, wherein the weight ratio of polyalkylene imine to polyester polymer is in the range of about 0.001–30:100.

3. The composition of claim 2 wherein the polyalkylene imine is polyethylene imine having a molecular weight (determined by light scattering) of greater than about 1000.

4. A process of combining polyakylene imine ("PAI") with an polyester polymer, said process comprising the steps of:
mixing the components at temperatures between about 150° C. and about 350° C. whereby the PAI forms a dispersed phase defining microscopic particles of less than 10 microns.

5. The process of claim 4 wherein the PAI particle size is less than 2 microns

6. The process of claim 5, wherein blending is performed in a high shear mixing apparatus.

7. The process of claim 6, further comprising:
blending the mixture resulting from the process of claim 6 with a second polyester polymer; and
forming a film from said mixture.

8. An interactive package capable of extending the shelf life of oil containing foods by scavenging aldehydes from said foods, said package comprising the material of claim 1.

9. A method of extending the shelf life of an oil containing food, said method comprising the steps of:
packaging the food in a film comprising the material of claim 1.

10. The film product of the process of claim 7 further comprising a functional barrier.

11. The composite film of claim 10 wherein the functional barrier is an polyester polymer and the thickness of the functional barrier is 3 mils or less.

* * * * *